Nov. 11, 1958 C. E. LOMAX 2,860,184

TELEPHONE SYSTEM SERVING BOTH REGULAR AND PAYSTATION TELEPHONES

Filed April 24, 1956 3 Sheets-Sheet 1

INVENTOR.
Clarence E. Lomax
BY Wm. Watts Owen.
Atty.

Nov. 11, 1958 C. E. LOMAX 2,860,184

TELEPHONE SYSTEM SERVING BOTH REGULAR AND PAYSTATION TELEPHONES

Filed April 24, 1956 3 Sheets-Sheet 2

INVENTOR.
Clarence E. Lomax
BY McWatters Owen
Atty.

Nov. 11, 1958 C. E. LOMAX 2,860,184

TELEPHONE SYSTEM SERVING BOTH REGULAR AND PAYSTATION TELEPHONES

Filed April 24, 1956 3 Sheets-Sheet 3

INVENTOR.
Clarence E. Lomax
BY Wm. Walter Owen.
Atty.

United States Patent Office 2,860,184

Patented Nov. 11, 1958

2,860,184

TELEPHONE SYSTEM SERVING BOTH REGULAR AND PAYSTATION TELEPHONES

Clarence E. Lomax, Chicago, Ill., assignor to General Telephone Laboratories, Incorporated, a corporation of Delaware Application April 24, 1956, Serial No. 580,239

7 Claims. (Cl. 179—6.3)

This invention relates in general to telephone systems serving both regular and paystation telephones and more particularly to the equipment providing such services.

It is a main object of the invention to provide an improved telephone system, wherein the circuit arrangement is such that regular and paystation telephones are served in a reliable, efficient and economical manner.

Another object of the invention is the provision of improved line circuits adaptable for use in the system and individual to the paystations.

Another object of the invention is the provision of an improved booster battery metering circuit adaptable for use with a common finder-selector link which serves both regular and paystation telephones.

Still another object of the invention is the provision of an improved combined line and recording (CLR) trunk adaptable for use with the above-mentioned metering circuit and link.

In accordance with the above-mentioned objects, a feature of the invention resides in the inclusion of a differential relay connected in series with the line conductors of the paystation line circuit, wherein this relay is operated in case the line is unbalanced before a particular connection is completed and this relay is effective to subsequently cause the release of the particular connection.

Another feature relates to means for shunting the above-mentioned differential relay to prevent its operation in case battery is reversed over the particular connection.

A further feature relates to means for rendering the above-mentioned differential relay unresponsive so that it can not cause the release of the connection when the line is unbalanced in case the connection is of a different nature and battery is not reversed thereover.

Still another feature relates to means in the paystation line circuit operated by one source of booster battery for causing the above-mentioned differential relay to be shunted, in case the connection is of a particular nature and battery is reversed over the connection.

A further feature relates to said above-mentioned means being operated by a different source of booster battery for causing the above-mentioned differential relay to be shunted in case the connection is of a different nature and battery is not reversed over the connection.

These and other objects and features of the invention will become apparent upon a further perusal of the specification and claims taken in conjunction with the accompanying drawings comprising Figs. 1–4, inclusive, which show by means of the usual diagrams a sufficient amount of the apparatus to enable the invention to be described and understood and in which:

In its preferred form, such as disclosed in the present application, a brief description of the invention will now be given.

Figures 1, 4:
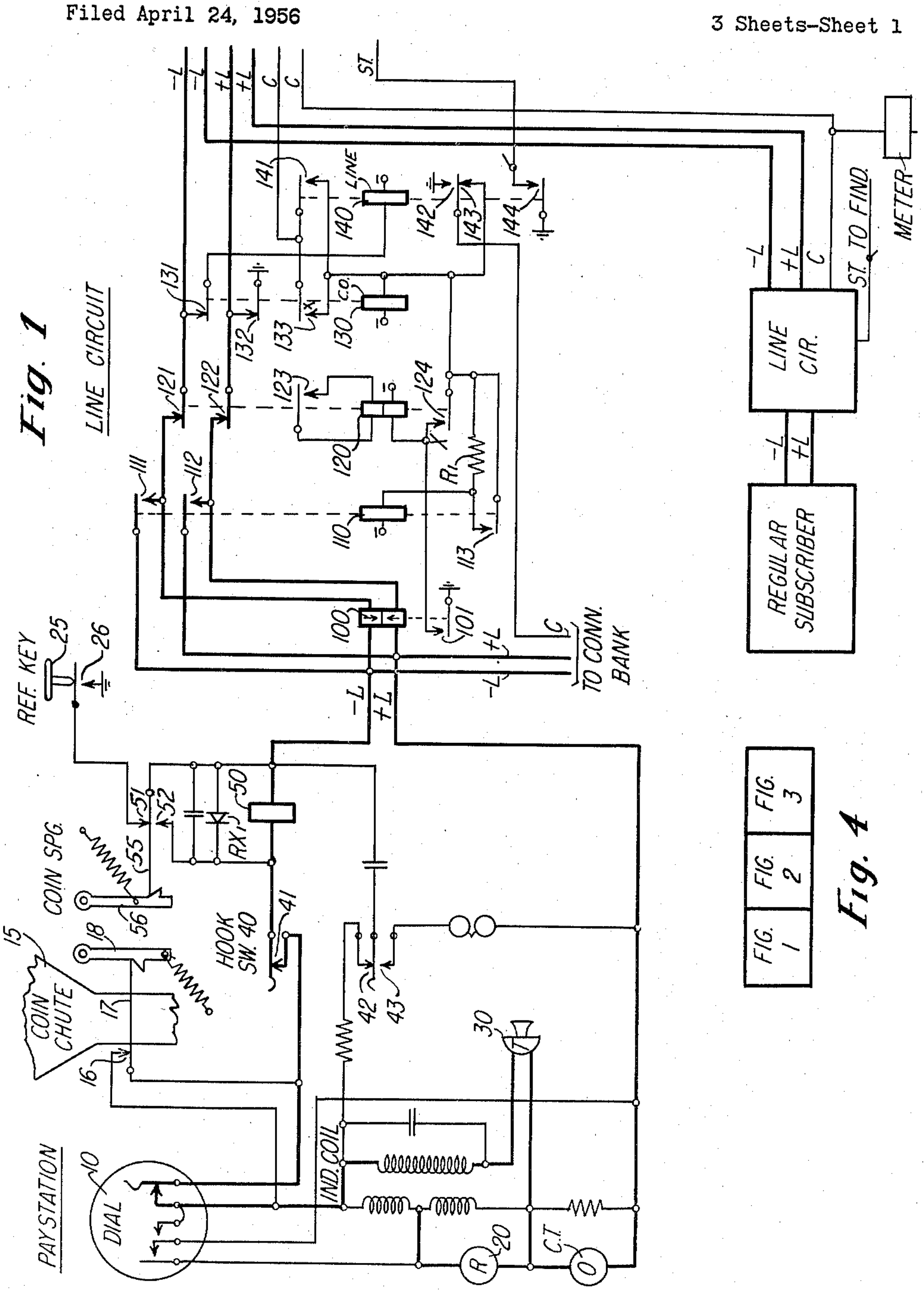
Fig. 1 shows in schematic form, the circuit of a prepay telephone paystation, the improved line circuit individual to the paystation and block diagrams representing a regular subscriber and his line circuit.
Fig. 4 is a block diagram showing how the sheets of the drawings should be arranged to properly illustrate the telephone system.

Referring in particular to the part of Fig. 1 showing the circuit arrangement of the paystation, it will be noted that this circuit is a modification of the paystation circuit dsclosed in the copending application filed May 31, 1951, Serial No. 229,051, by Clarence E. Lomax, now U. S. Patent 2,750,447, issued June 12, 1956. Further it will also be noted that the type of mechanism used with this particular circuit arrangement is a modification of the paystation mechanism disclosed in the copending application filed December 5, 1951, Serial No. 259,961 by Hans Sengebusch, now U. S. Patent 2,735,891, issued February 21, 1956.

Referring to the part of Fig. 1 representing the paystation line circuit, it will be appreciated that during the initiation of a call the line circuit functions in a normal manner. A differential relay is connected in series with the line conductors of the line circuit and is operated, in case the current in the line is unbalanced responsive to a refund attempt before the call is answered, to cause the operation of another relay, which in turn opens the line conductors to cause the connection to be released. If a refund is not attempted and the call is answered, booster battery is received at the paystation line circuit for operating a relay which places a shunt across the windings of the differential relay to prevent it from thereafter operating in response to line unbalancings, and the transmitter current is increased over the established connection.

Briefly, the aforementioned Sengebusch application operates in the following manner:

The coin chute, trigger and hopper are of the conventional type, while the coin trap is operated by a lever instead of the polarized magnets, which usually is the case. The dial pulsing springs are normally shunted by contacts controlled by the coin trigger and it is only after the coin trigger is operated by a deposited coin, or coins, to open these contacts that the shunt is removed in order that the calling party may operate the dial for extending the desired connection. The deposited coin is arrested and held in the hopper (not shown) by the coin trap until either the call is abandoned or answered. In case the call is abandoned and the connection is released, the refund (push) key is manually operated to move the above-mentioned lever in one direction and cause the refund of the deposit. If the call is answered, reverse battery is applied to the connection by the connector, or toll operator, to operate the coin magnet which was previously polarized due to a rectifier shunt, to cause its armature to lock and allow only movement of the lever in the opposite direction. The refund key is rendered ineffective and at the completion of the call, the replacing of the handset on the hookswitch operates a linkage (not shown) which moves the lever in the opposite direction to collect the deposit.

Figure 2:
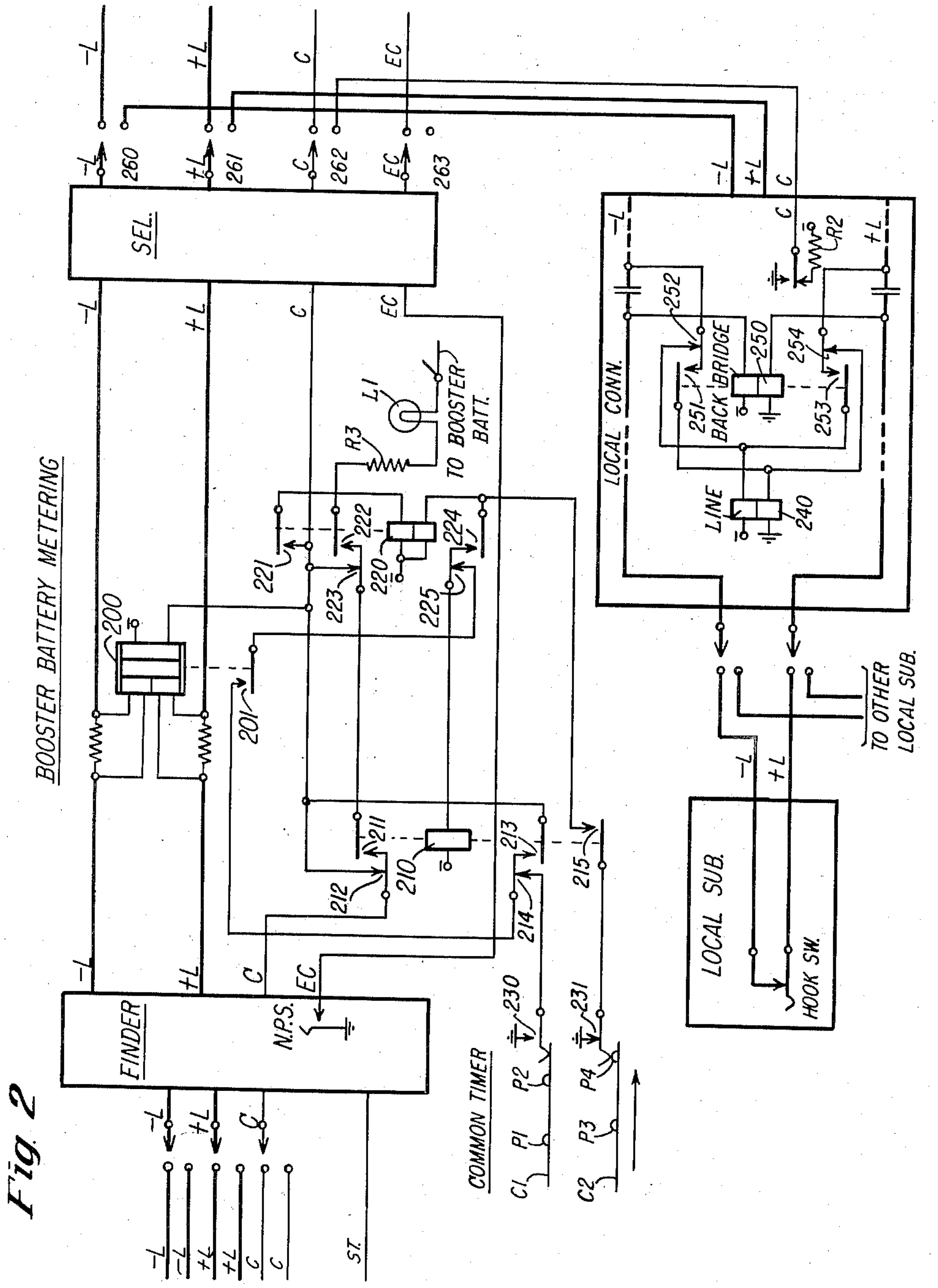
Fig. 2 shows block diagrams representing a finder and selector, with the schematic representation of the improved booster battery metering circuit connected therebetween. Additionally, the lower portion of Fig. 2 discloses block diagrams representing a local subscriber and a local connector.

Referring to the block diagram representing the local connector shown in the lower portion of Fig. 2 of the instant disclosure, it will be appreciated that this connector may be of any well-known type adaptable for use with a telephone system where the paystations included therein require reverse battery application for proper operation and reverse battery is required to initiate metering operations on local calls. Only the line and back-bridge relays have been shown in applicant's block diagram, however reference may be had to U. S. Patent No. 1,889,-229, granted November 29, 1932, to V. S. Tharp for a more detailed operational description of such a connector adaptable for use herewith.

The finder and selector shown in the block diagrams of Fig. 2 may represent any common and well-known type of finder and selector adaptable for use with a telephone system of this particular design; wherein the finder serves both paystation and regular lines and the level or levels which serve the paystations are equipped with normal post springs such as NPS that are operated when a calling paystation is connected with these levels to send a marking out over the connection as an indication that the calling line is a paystation line; and wherein the selector may be any common standard four wiper selector of the battery searching type.

The booster battery metering circuit includes a shunt field electro-polarized relay which is operated in a well-known manner responsive to battery being reversed over the line for initiating the application of booster battery by means of a common timing device.

Figure 3:
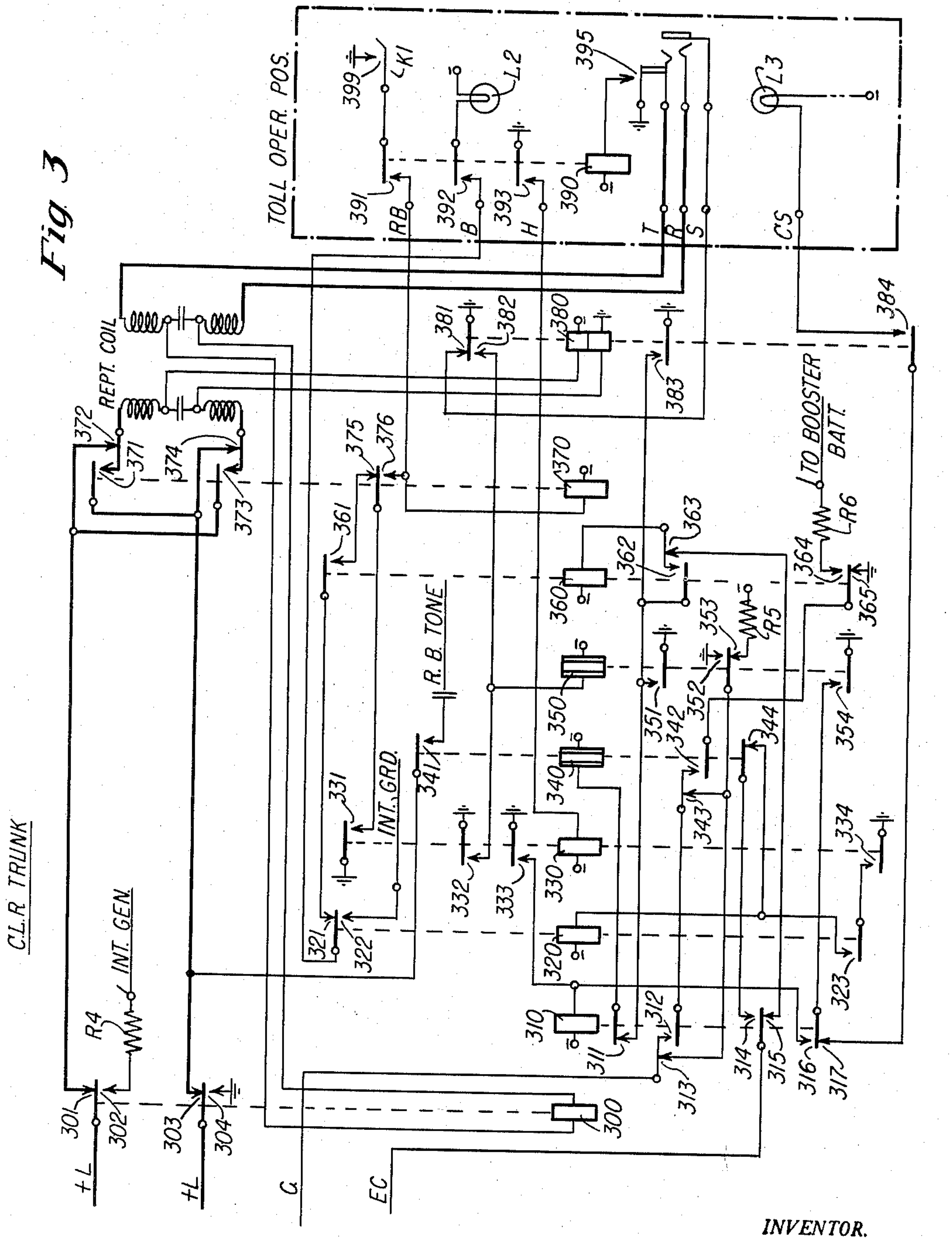
Fig. 3 shows in schematic form, the improved CLR trunk terminating in jacks and accessible by a CLR, or toll, operator.

The improved CLR trunk disclosed in Fig. 3 is arranged to serve both regular lines and paystation lines and terminates at a CLR or toll operator's position. At the time that the trunk is seized, a subscriber identification relay is either operated or not, depending upon whether a marking potential is, or is not, applied by the finder normal post springs NPS to the EC conductor. If a paystation is calling, the EC conductor is grounded and a subscriber identification relay in the CLR trunk is operated to prepare the return of booster battery back over the connection and prepare a circuit for a subscriber identification lamp such as L2 at the operator's position to light after the operator plugs in to answer the call. Responsive to the operator plugging in, booster battery is applied to the C conductor of the conection and causes the differential relay of the paystation line circuit to be shunted as previously described. In this manner, the transmitter current of the connection is increased, the polarized relay at the paystation is not operated, the coin mechanism at the paystation is still in the refund position and the paystation user is able to refund the initial deposit without causing the release of the connection. After the toll call is established and the proper deposit is made, the operator then causes battery to be reversed and sent back over the connection to cause the polarized relay at the paystation to operate and position the coin mechanism to the collect position. If a regular line is calling, the EC conductor is not grounded, the above-mentioned identification relay is not operated, booster battery is not sent back over the connection from the trunk and the subscriber identification lamp is not lighted at any time. When the toll call is established the operator then causes reverse battery to be sent back over the connection for operating the polarized relay in the booster battery metering circuit of Fig. 2, whereby booster battery from this metering circuit is subsequently applied to the connection for operating the regular subscriber's meter.

A more detailed description of the invention will now follow.

Referring to the drawings represented by Figs. 1–3, inclusive, and arranged as shown in Fig. 4, it will be noted that a paystation line and a regular line are served by the same finder and selector when making calls to a local subscriber. Additionally, the same finder, selector and CLR trunk serve these lines when a toll call is made. In the ensuing detailed operational descriptions, four different types of calls will be described, hence it is thought best to list each of them under appropriate headings relating to each particular type of call. The first of these types of calls will now be described.

*Paystation line to local subscriber*

In the following operational description of the above-mentioned type of call, it will be appreciated that the calling party is using a paystation such as disclosed in Fig. 1 and will call a local subscriber such as represented in block diagram and shown in the lower portion of Fig. 2.

Referring in particular to Figs. 1 and 2, it will be assumed that the calling party at the paystation has just removed his receiver, whereby contacts 41 and 42 of hookswitch 40 are closed as shown to complete the paystation loop circuit over a path traced from ground at contacts 132, contacts 122, the lower winding of differential relay 100, the +L line conductor, over an obvious path through the paystation, the −L line conductor, the upper winding of differential relay 100, contacts 121, 131 and through the winding of line relay 140 to battery.

In actuating its contacts, line relay 140 prepares a circuit for cut-off relay 130 at contacts 141, busies the C conductor of the paystation line circuit to incoming calls at contacts 142, disconnects the cut-off relay 130 from the incoming connector C conductor at contacts 143 and grounds the finder-start circuit ST at contacts 144.

The grounding of the finder-start circuit ST starts the first idle finder in a well-known manner and causes it to hunt for and seize the line of the calling paystation. Subsequent to the seizure, dial tone (not shown) is returned to the calling line in a well-known manner.

At the time that the finder seizes the calling paystation line, ground (not shown) is returned to the paystation line circuit over the C conductor from the finder. This ground completes a circuit for the cut-off relay 130 and extends from the aforementioned ground in the finder, the finder C wiper and engaged contact, the C conductor of the paystation, contacts 141 and through the winding of cut-off relay 130 to battery. In actuating its contacts, cut-off relay 130 completes its own locking circuit at "X" contacts 133 and opens the previously traced operating circuit of line relay 140 at contacts 131 and 132.

It will be appreciated that at the same time the C conductor from the finder was grounded and the cut-off relay 130 operated, shunting relay 110 was also obviously energized, however the resistance of its winding and the value of resistance R1 prevented sufficient current flow in the energizing circuit to allow operation of this relay for the time being.

The receipt of the dial tone is an indication to the calling party at the paystation that he must first deposit the required fee. The calling party then dials the first digit of the call number of the local subscriber, with the finder-selector link functioning in a common and well-known manner to establish a connection with the local connector. The remaining digits of the call number are then dialled to establish the signalling connection with the local subscriber.

Before continuing with the present description, it is thought advisable to discuss the function of differential relay 100 and the operation of the equipment in the event that the calling party should desire to abandon the call or if he were to fraudulently attempt to obtain a free call, at a time subsequent to dialling but prior to the answering of the call by a local subscriber. In either case, the calling party will depress his refund key 25 to effect a refund operation. Since battery has not been reversed over the line to cause an operation of the polarized coin magnet 50, the coin mechanism is in the refund position and an operation of refund key 25 will operate this mechanism as previously referred to and described to refund the deposited coin. The depressing of refund key 25 also closes contacts 26 to connect ground to the −L and +L line conductors of the paystation and thereby cause an obvious unbalancing of the current through the windings of differential relay 100 to cause this relay to operate.

In actuating its contacts, differential relay 100 completes an obvious circuit at contacts 101 for operating release relay 120.

In actuating its contacts, release relay 120 completes its own obvious locking circuit at "X" contacts 124 to the grounded C conductor, opens the —L and +L line conductors at contacts 121 and 122 for initiating the release of the associated switch train and shunts its upper winding at contacts 123 to render itself slow-to-release. Since the connection is opened, the switching equipment may restore to normal in a well-known manner.

Assuming for the moment that the called local subscriber is busy, the calling party may replace his receiver to open the loop circuit for initiating the release of the connection and then depress his refund key 25 to return his deposit; or he may depress his refund key first, at which time the equipment will operate and release as described above for an abandoned call.

Continuing now with the present call, it is assumed that the call is not abandoned and that the called local subscriber is not busy. When the called local subscriber answers the call after a reasonable time, the removal of his handset closes his hookswitch contacts to cause the local connector to operate and reverse the polarity of the talking battery potential applied to the line conductors of the connection in a common and well-known manner.

The battery reversal to the line conductors of the connection causes the rectifier RX1 at the paystation to be rendered non-conductive and as such, coin magnet 50 is no longer short circuited and polarized due to the rectifier shunt and therefore operates. Also, reverse battery causes operation of electro-polarized relay 200 in the booster battery metering circuit of Fig. 2 in a well-known manner.

The operation of coin magnet 50 positions the coin control mechanism (not shown) from the refund position to the collect position and locks its armature operated by engaging it with the notch on locking element 56, whereby contacts 51 are opened to prevent any subsequent operations of refund key 25 from unbalancing the line conductors, while contacts 52 are closed to shunt the winding of magnet 50 for excluding this winding from the talking conductors to increase the current flow in the connection.

In actuating its contacts, electro-polarized relay 200 prepares a point in the energizing circuit of relay 210 at contacts 201.

The operation of the common timer such as shown in Fig. 2 is assumed to be well-known. However, it is thought advisable to point out that when the raised section P2 of the cam C1, which is constantly rotating in the direction of the arrow, momentarily operates the wiper to close contacts 230, a circuit is completed for operating relay 210 and may be traced as extending from ground at contacts 230, contacts 214, 201, 225 and through the winding of relay 210 to battery.

In actuating its contacts, relay 210 prepares a point at contacts 211 in the circuit for application of booster battery to the C conductor of the paystation, opens a point at contacts 212 in the C conductor from the selector to the finder, completes its holding circuit at contacts 213 to the grounded C conductor from the selector or release trunk, disconnects further ground pulses at contacts 214 from the raised sections of cam C1 and prepares a point in the energizing circuit of relay 220 at contacts 215. Even though a point in the C conductor was opened at contacts 212, the extension of this grounded C conductor is maintained complete by way of contacts 211 of relay 210 and contacts 223 of relay 220 for holding the cut-off relay 130 of the paystation line circuit operated.

As the cams such as C1 and C2 of the timer continue to rotate in the direction of the arrow, the raised section P3 of the cam C2 operates the wiper to close contacts 231. An obvious circuit is thus completed for operating relay 220 over its lower winding.

In actuating its contacts, relay 220 completes its own holding circuit at contacts 221 by connecting its upper winding to the grounded C conductor, applies booster battery at contacts 222 to the finder C conductor, opens the aforementioned alternate grounding circuit at contacts 223 for the finder C conductor so that both booster battery and ground are not on this conductor simultaneously, completes a circuit at contacts 224 for holding relay 210 operated during the time that section P3 of cam C2 is holding contacts 231 closed and opens the previous energizing circuit of relay 210 at contacts 225.

The application of booster battery to the finder C conductor completes a circuit for operating shunting relay 110 and may be traced from the booster battery source, lamp L1, resistance R3, contacts 222, 211, finder, finder C wiper and engaged bank contact terminating the line circuit C conductor, contacts 133, resistance R1 and through the winding of relay 110 to battery. It will be noted that the booster battery is of sufficient potential to operate relay 110 even though resistance R1 is in series therewith.

In actuating its contacts, shunting relay 110 completes obvious circuits at contacts 111 and 112 for shunting both windings of differential relay 100 and completes its own locking circuit at contacts 113 to the regular ground by shunting resistance R1.

By this time, section P3 of cam C2 is no longer holding contacts 231 closed and as a result, relay 210 will restore.

In restoring, relay 210 removes booster battery from the finder C conductor at contacts 211, and reconnects the C conductor from the selector to the finder to again provide holding ground for the aforementioned purposes.

No further operations take place and conversation between the calling party at the paystation and the called local subscriber may be held in a normal manner, with line relay 240 of the local connector supplying talking battery for the calling paystation and back-bridge relay 250 of the local connector supplying talking battery for the called local subscriber.

At the end of conversation and responsive to the calling and called parties replacing their receivers, the equippent is restored in a well-known manner and conditioned to handle future calls.

*Paystation line to CLR operator*

For the above-mentioned type of call, it will be appreciated that the calling party is using a paystation such as disclosed in Fig. 1 and that he intends to place a call of the type requiring the services of a CLR, or toll, operator to complete the extension of the call. This operator has access to the CLR trunk at the toll operator's position such as shown in the dotted rectangle at the right-hand side of Fig. 3, with this position being individual to the disclosed CLR trunk.

Reference will be had to Figs. 1–3 in describing the above-named type of call. It will be appreciated that the same equipment is taken into use and the same operations take place as described in the operational description of the section entitled "Paystation line to local subscriber" up to and including the point in the description where the first digit of the call number is dialled.

At this time it is thought advisable to explain that all the CLR trunks such as disclosed in Fig. 3 are connected to the selector bank contacts located in one particular level or plurality of levels preferably adjacent to one another, and accessible thereto by the selector wipers such as 260 through 263. In this particular case and for one method of illustration, it is assumed that these CLR trunks are connected to the tenth or "0" contact bank level and that they are accessible to the selector responsive to the calling party dialling the single digit "0."

Therefore, the selector is stepped to the tenth vertical contact bank level and subsequently starts its rotary hunting over this level in a well-known manner to search for the battery potential indicative of an idle CLR trunk.

At the time that the selector C wiper 262 engages the bank contact terminating the C conductor of the disclosed CLR trunk which is shown to be idle, the battery potential impressed thereon causes the selector to operate and stop on these bank contacts and switch through in a well-known manner.

Assuming for the moment, that upon searching the entire level and finding all the CLR trunks busy, an all-trunk busy tone would be transmitted to the calling party in a well-known manner.

However, as the disclosed trunk is not busy and as the —L and +L talking conductors are extended into the CLR trunk responsive to the selector switching through, an obvious circuit is completed by way of the paystation loop circuit for operating the trunk line relay 380. Also, at the time that the selector switches through, a circuit is completed for operating the subscriber identification relay 360. The circuit for relay 360 may be traced from ground at the finder normal post springs NPS, the EC conductor through the finder-selector link, the selector EC wiper 263 and engaged bank contact, the EC conductor of the CLR trunk, contacts 315, 363 and through the winding of relay 360 to battery. This ground that is forwarded to the CLR trunk from the finder NPS springs is only present on the EC conductor when a paystation is calling.

In actuating its contacts, line relay 380 removes ground at contacts 381 from the sleeve conductor S to the operator's position, completes an obvious circuit at contacts 382 for operating relay 350, completes an obvious circuit at contacts 383 for operating relay 340 and prepares a point in the circuit at contacts 384 for the call signalling lamp L3.

In actuating its contacts, subscriber identification relay 360 prepares a point in the circuit at contacts 361 for the paystation identification lamp L2, completes its own obvious locking circuit at contacts 362, opens its previously described energizing circuit at contacts 363, prepares a point at contacts 364 in the circuit for the application of booster battery to the trunk C conductor and removes ground potential at contacts 365 from a point in the last-mentioned circuit.

In actuating its contacts, relay 350 provides a holding ground at contacts 351 for relays 360 and 340, applies busying ground at contacts 352 to the trunk C conductor, removes battery at contacts 353 from the trunk C conductor and completes a circuit at contacts 354 for the call signalling lamp L3.

In actuating its contacts, relay 340 applies ring-back tone at contacts 341 to the +L talking conductor back to the calling paystation in a well-known manner, prepares another point at contacts 342 in the application of booster battery to the trunk C conductor and opens a point at contacts 344 in the energizing circuit of relay 320.

Upon observing the steady burning of lamp L3, the operator plugs in to answer the call in a well-known manner. Responsive to the plugging in, relay 390 at the operator's position is operated from ground over contacts 395 in an obvious manner.

In actuating its contacts, relay 390 prepares a point in the circuit at contacts 391 for battery reversing relay 370, prepares a point in the circuit at contacts 392 for the call identification lamp L2 and completes an obvious circuit at contacts 393 for relay 330.

In actuating its contacts, relay 330 completes a circuit at contacts 331 for lighting call identification lamp L2, provides a holding ground at contacts 332 for relay 350, completes an obvious circuit at contacts 333 for operating relay 310 and prepares a point at contacts 334 in the holding circuit for relay 320. The circuit for lamp L2 may be traced from ground at contacts 331, contacts 375, 361, 321, 392 and through lamp L2 to battery. Lamp L2 will burn steadily for a short period of time and serves by this type of burning to indicate to the operator that the incoming call originated at a paystation.

In actuating its contacts, relay 310 opens the circuit at contacts 311 for restoring relay 340, completes the circuit at contacts 312 for the application of booster battery to the trunk C conductor, removes the aforementioned ground at contacts 313 from the trunk C conductor, prepares a point at contacts 314 in the operating circuit for relay 320, opens contacts 315 to remove the marking potential forwarded over the EC conductor to the CLR trunk from the finder NPS springs to relay 360, completes its own obvious locking circuit at contacts 316 and opens the circuit at contacts 317 for extinguishing call signalling lamp L3 as an indication to the operator that she has answered the call. The application of booster battery to the connection may be traced as follows: from booster battery potential through resistance R6, contacts 364, 342, 312, the trunk C conductor, the bank contact engaged by the selector C wiper 262, the C conductor through the booster battery metering circuit of Fig. 2, contacts 212, the finder C wiper and the engaged bank contact, C conductor of the line circuit, contacts 133, resistance R1 and through the winding of shunting relay 110 to battery. The shunting relay 110 operates in the same manner as described in the section entitled "Paystation line to local subscriber." It will be noted that relay 340 is constructed as being slow-to-release, in order for booster battery to be applied to the above traced circuit for a period of time corresponding to the release time of relay 340, and to delay the operation of relay 320 until booster battery has been removed, as will hereafter be described.

In releasing its contacts after a period of time, relay 340 removes ring-back tone at contacts 341 from the aforementioned line conductor, removes booster battery from the previously traced booster battery circuit to the trunk C conductor at contacts 342, applies ground at contacts 343 to the trunk C conductor and completes an operating circuit for relay 320 at contacts 344. This operating circuit for relay 320 may be traced from the ground on the EC conductor, contacts 314, 344, and through the winding of relay 320 to battery.

In actuating its contacts, relay 320 opens the circuit at contacts 321 to extinguish the steady burning of lamp L2, completes an obvious circuit at contacts 322 for causing the intermittent flashing of lamp L2 and completes an obvious locking circuit at contacts 323 for itself. In addition to first indicating to the operator that the incoming call was from a paystation, lamp L2 further indicated by burning steadily that booster battery was being applied to the line and later indicated by its intermittent flashing that the booster battery was removed.

At this stage of the description the operator receives the necessary information from the calling party to establish the desired toll call and requests that the calling party refund the initial deposit that was made in order to enable him to dial to establish the present connection. The calling party depresses his refund key 25 to cause the requested refund. Since the booster battery received at the paystation from the CLR trunk effected the shunting of differential relay 100, the grounding of the line by refund key 25 is ineffective at this stage of the extension of the call for causing the release of the connection. However, if refund key 25 is operated before the application of booster battery, the connection will release as previously described.

The equipment is now in condition for the operator to set up the toll call, at which time the calling party at the paystation is requested to deposit the proper toll fee. Upon making sure that the proper fee has been deposited and that the connection between the calling and called party is established, the operator then momentarily depresses key K1. The depressing of key K1 closes contacts 399 to complete an obvious circuit for operating the battery reversing relay 370.

In actuating its contacts, reversing relay 370 reverses the battery potential applied to the −L and +L line conductors to the calling paystation at contacts 371 through 374, inclusive, and completes its own locking circuit to ground from contacts 331 at its own contacts 376.

The reversal of battery on the line conductors causes polar relay 200 of the booster battery metering circuit in Fig. 2 to operate in an obvious manner. The operation of this equipment in Fig. 2 is the same as described in the previous section entitled "Paystation line to local subscriber." However, the operations of this equipment has no effect on the present connection since booster battery from the CLR trunk has already caused the operations as just described.

The reversal of battery received at the paystation causes rectifier RX1 to be rendered conductive and as such, coin magnet 50 is no longer polarized and operates. Coin magnet 50 therefore operates as previously described.

Conversation may now take place over the established connection, with line relay 380 of the CLR trunk providing talking battery for the calling party and the line relay of the connector (not shown) associated with the called party providing talking battery for the called party.

The release of the illustrated equipment during the present type of call is under direct control of the operator. Namely, if the party at the paystation were to replace his receiver at the end of conversation, only line relay 380 would restore and the connection would still be maintained by the hold relay 350 which is energized and locked operated to contacts 332 of relay 330. Relay 330 in turn is maintained operated by the relay 390, which is under direct control of the operator's plug.

The above arrangement is necessary in order for the operator to obtain proper toll charges in case there may be a necessity for a subsequent additional toll deposit. In another case, if the party desired by the calling party is not available at that moment, the calling party may replace his receiver and later be signalled by the operator when the connection is made. The method of initiating the signalling of the calling party may be in any well-known manner, in which any well-known means under control of the operator is momentarily operated to cause the temporary operation of the recall relay 300. In actuating its contacts, recall relay 300 opens the line conductors at contacts 301 and 303 to temporarily allow line relay 380 to restore and apply ringing current to the line conductors to the paystation at contacts 302 and 304 in a well-known manner. The calling party at the paystation removes his receiver to answer the operator signal and his talking connection with the desired party may then be established.

As previously mentioned the operator has direct control of releasing the connection. Therefore, at the end of conversation and when the operator has received a disconnect signal in any well-known manner responsive to the calling and called parties replacing their receivers, she removes her plug and thus effects the release of relays 390 and 330 which in turn open the locking circuit of hold relay 350. The restoring of relay 350 causes the equipment to release in a well-known manner to thus condition it to handle future calls.

*Regular line to local subscriber*

During the description of the above-mentioned type of call it will be assumed that the calling party is a regular, or non-paystation, subscriber calling from any well-known type of telephone having all the usual and well-known instrumentalities, with said subscriber station being represented in block diagram such as shown in the lower part of Fig. 1. It will also be assumed that the called party is a local subscriber station such as represented in block diagram and shown in the lower part of Fig. 2.

Referring in particular to Figs. 1 and 2, it will be assumed that the calling regular subscriber has just removed his receiver (not shown) to complete his loop circuit for initiating the extension of the above-mentioned type of call. The finder is started in a well-known manner, thereby causing it to hunt for and seize the line of the calling regular subscriber. Subsequent to seizure, dial tone (not shown) is returned to the calling line in a well-known manner.

The receipt of dial tone is an indication to the calling party that dialling may be started. The first digit of the call number of the desired local subscriber is now dialled, with the finder-selector link functioning in a common and well-known manner to establish a connection with the local connector. The remaining digits of the call number are then dialled to establish a signalling connection with the local subscriber.

Assuming for the moment that either the call is to be abandoned or the called party is busy, the equipment will restore to normal in a well-known manner responsive to the calling party replacing his receiver to open the loop circuit.

Continuing now with the present call, it is assumed that the call is not abandoned and that the called local subscriber is not busy. When the called party answers the call after a reasonable length of time, the removal of his handset closes his hookswitch contacts to cause the local connector to operate and reverse the polarity of the talking battery potential applied to the line conductors of the connection in a common and well-known manner.

The battery reversal to the line conductors of the connection causes the operation of electro-polarized relay 200 in the booster battery metering circuit of Fig. 2 in a well-known manner. The operation of both the electro-polarized relay 200 and the remainder of the equipment shown in this booster battery metering circuit is the same as that previously described in the section entitled "Paystation line to local subscriber," with the exception that the booster battery transmitted back over the C conductor of the established connection operates only the meter individual to the calling line and not the line circuit equipment such as shown and previously described when the paystation line was calling a local subscriber.

No further operations take place and conversation between the calling party and called party may be held in a normal manner, with line relay 240 of the local connector supplying talking battery for the calling subscriber and back-bridge relay 250 of the local connector supplying talking battery for the called subscriber.

At the end of conversation and responsive to the calling and called parties replacing their receivers, the equipment is restored in a well-known manner and conditioned to handle future calls.

*Regular line to CLR operator*

For the above-mentioned type of call it will be assumed that the calling party is the regular subscriber such as described in the section entitled "Regular line to local subscriber" and that for this type of call he intends to place a call requiring the services of a CLR, or toll, operator such as described in the section entitled "Paystation line to CLR operator."

Reference will be had to Figs. 1–3, inclusive during the time that the above-named type of call is described and is in progress. It will be noted that the same equipment is taken into use and the same operations take place as covered in the previously described sections up to and including the dialling of the first digit, which in this case is the digit "0." As previously described, the selector hunts for and connects with the first idle CLR trunk, which we will assume to be the one shown in Fig. 3.

It will be remembered that since the calling line is that of a regular subscriber station, the finder NPS springs are not operated and ground is not forwarded over the EC conductor to the CLR trunk. As the selector switches through responsive to seizure, a circuit is completed in a well known-manner for operating the trunk line relay 380.

In actuating its contacts, line relay 380 removes ground at contacts 381 from the sleeve conductor to its operator's jack, completes an obvious circuit at contacts 382 for operating the trunk hold relay 350, completes an obvious circuit at contacts 383 for operating relay 340 and prepares a point in the circuit at contacts 384 for call answering lamp L3.

In actuating its contacts, hold relay 350 applies a multiple ground at contacts 351 for holding relay 340 operated, grounds the trunk C conductor at contacts 352 to busy it to other calls, removes battery from the trunk C conductor at contacts 353 to prevent seizure by other selectors and completes an obvious circuit at contacts 354 for lighting the call signalling lamp L3.

In actuating its contacts, relay 340 applies ring-back tone at contacts 341 to the calling line in a well-known manner, prepares an alternate circuit at contacts 342 for applying ground to the trunk C conductor, opens contacts 343 with no effect at the present and opens contacts 344 to prevent any possible operation of relay 320.

Upon observing the steady burning of lamp L3, the operator plugs in to answer the call in a well-known manner. Responsive to the plugging in, relay 390 at the operator's position is operated from ground over contacts 395 in an obvious manner.

In actuating its contacts, relay 390 prepares a point in the circuit at contacts 391 for operating relay 370, performs no useful function at contacts 392 and completes an obvious circuit at contacts 393 for operating relay 330. It will be noted at this time that since a regular subscriber is calling instead of a paystation and that no ground potential is present on the EC conductor, subscriber identification relay 360 will not be operated thus making it impossible to complete the circuit for lighting the call identification lamp L2 and also impossible to send booster battery from the trunk to the present type of connection.

In actuating its contacts, relay 330 performs no useful function at contacts 331, completes a circuit at contacts 332 for maintaining relay 350 operated, completes an obvious circuit at contacts 333 for operating relay 310 and performs no useful function at contacts 344.

In actuating its contacts, relay 310 opens the circuit at contacts 311 to the slow-to-release relay 340, prepares an alternate circuit at contacts 312 and 313 for grounding the trunk C conductor, performs no useful function at contacts 314 and 315, completes its own locking circuit at contacts 316 from grounded contacts 344 and opens the circuit at contacts 317 to extinguish lamp L3.

In releasing its contacts after a period of time, the primary purpose of relay 340 is to remove ring-back tone at contacts 341 from the calling line.

The extinguishing of lamp L3 is an indication to the operator that she has answered the call and that she may subsequently request the proper information from the calling subscribed to set up the desired toll call. Further, since lamp L2 is not lighted at any time this informs the operator that the present call originated at a non-paystation. After establishing the toll call and making sure that the talking connection is satisfactory, the operator then momentarily depresses key K1. The depressing of key K1 closes contacts 399 to complete an obvious circuit for operating the battery reversing relay 370.

In actuating its contacts, reversing relay 370 reverses the battery potential applied to the —L and +L line conductors to the calling subscriber at contacts 371–374, inclusive, and completes its own locking circuit at contacts 376 to grounded contacts 331.

The reversal of battery on the line conductors to the calling party causes polar relay 200 of the booster battery metering circuit in Fig. 2 to operate in an obvious manner. The operation of this equipment in Fig. 2 is the same as described in the previous section entitled "Paystation line to local subscriber." The booster battery applied to the C conductor of the established connection, however will operate only the meter individual to the calling regular subscriber.

Conversation may now take place over the established connection, with line relay 380 of the CLR trunk providing talking battery for the calling subscriber and the line relay of the connector (not shown) associated with the called party, in the established toll call, providing talking battery therefor.

Recall and the release is under direct control of the operator and is thought to be sufficiently described in the above-mentioned section. Therefore, at the end of conversation and when the operator has received a disconnect signal she removes her plug and thus causes the equipment to restore in a well-known manner and as such it is conditioned to handle future calls.

Having described my invention, what is considered new and desired to have protected by Letters Patent will be pointed out in the appended claims.

What is claimed is:

1. In a telephone system, a calling paystation line, a finder-selector link having access thereto for extending a desired connection normally comprising line conductors, a line circuit individual to said paystation line, means including said finder operated responsive to the initiation of a call by said paystation for connecting said link with said paystation line over said line circuit to initiate the extension of said connection, a refund key at said paystation, means operated responsive to the operation of said refund key for unbalancing said line conductors in said connection, a differential relay in said line circuit having its windings connected in series with the said line conductors of said connection and operated responsive to said unbalancing of said line conductors in case said unbalancing takes place before said desired connection is further extended and completed, a release relay in said line circuit, means controlled by the operation of said differential relay for completing a circuit to operate said release relay, and means operated by said release relay for initiating the release of said connection.

2. In a telephone system, a calling paystation line, a finder-selector link having access thereto for extending a desired connection, a line circuit individual to said paystation line, a toll operator's position for extending a desired toll connection, a trunk circuit accessible to said link and terminating at said position, means including said finder operated responsive to the initiation of a toll call by said paystation for connecting said link with said paystation line over said line circuit to initiate the extension of said connection, means including said selector for further extending said desired toll connection to said operator's position over said trunk circuit, a refund key at said paystation, and means including release means in said line circuit operated in case said key is operated responsive to a refund operation by said paystation before said desired toll connection is answered at the operator's position for initiating the release of said connection.

3. In a telephone system, a calling paystation line, a finder-selector link having access thereto for extending a desired connection, a line circuit individual to said paystation line, a toll operator's position for extending a desired toll connection, a trunk circuit accessible to said link and terminating at said position, means including said finder operated responsive to the initiation of a toll call by said paystation for connecting said link with said paystation line over said line circuit to initiate the extension of said toll connection, means including said selector for further extending said desired toll connection to said operator's position over said trunk circuit, a refund key at said paystation, release means including control means in said line circuit operated in case said key is operated responsive to a refund operation by said paystation before said desired toll connection is answered at the operator's position for initiating the release of said connection, a source of booster battery potential included in said trunk, means in said trunk operated in response to said operator answering said call before said refund key is operated for applying said booster battery potential to said connection, means in said line circuit operated responsive to receipt of said booster battery, and means controlled by said last-mentioned means for rendering the said release means including the control means unresponsive to subsequent refund operations of said refund key.

4. In a telephone system, a calling paystation line, a local subscriber station, a finder-selector link having access thereto for extending a desired connection, a line circuit individual to said paystation line, means including said finder operated responsive to the initiation of a local call by said paystation for connecting said link with said paystation line over said line circuit to initiate the extension of said connection, a local connector, means including said selector for further extending said connection to signal said local subscriber over said local connector, a refund key at said paystation, means including release means in said line circuit operated in case said key is operated in response to a refund operation by said paystation, and before said local connection is answered, for initiating the release of said connection, a source of booster battery potential included in said link, means including control means in said link for controlling the application of said booster battery potential to said connection, means in said local connector operated responsive to said local subscriber answering said call and in case said refund key is not operated for operating the said last-mentioned means, means in said line circuit operated responsive to receipt of said booster battery, and means controlled by this said last-mentioned means for rendering the said means including the release means unresponsive to subsequent refund operations.

5. In a telephone system, a calling paystation line, a finder-selector link having access thereto for extending a desired connection normally comprising line conductors, a line circuit individual to said paystation line, a toll operator's position for extending a desired toll connection, a trunk circuit accessible to said link and terminating at said position, means including said finder operated responsive to the initiation of a toll call by said paystation for connecting said link with said paystation line over said line circuit to initiate the extension of said connection, means including said selector for further extending said desired toll connection to said operator's position over said trunk circuit, a refund key at said paystation, means operated responsive to the operation of said refund key for unbalancing said line conductors in said connection, a differential relay in said line circuit and having its windings connected in series with the said line conductors of said connection, said differential relay operated responsive to said unbalancing of said line conductors only in case said connection is unanswered at said operator's position, means including release means operated responsive to the operation of said differential relay for initiating the release of said connection, a marking potential in the finder portion of said link, means for extending said marking to said trunk circuit, a control relay in said trunk circuit operated responsive to receipt of said marking, an indicating lamp at said operator's position, means including contacts operated by said control relay for illuminating said lamp in case said extended toll connection has been answered at said position, to indicate to said answering operator that said call originated at said paystation, a source of booster battery potential included in said trunk, means including other contacts operated by said control relay for applying said booster battery to said connection, and means including shunting means operated responsive to receipt of said booster battery for shunting the windings of said differential relay to exclude it from said connection and increase the current flow in said connection, said shunting of said differential relay also rendering it unresponsive to subsequent unbalancings of said line conductors by subsequent operations of said refund key.

6. In a telephone system, a calling paystation line, a finder-selector link having access thereto for extending a desired connection, a line circuit individual to said paystation line, a toll operator's position for extending a desired toll connection, a trunk circuit accessible to said link and terminating at said position, means including said link operated responsive to the initiation of a toll call by said paystation for extending said connection to said operator's position by way of said line circuit, said link and said trunk circuit, a slow-to-release relay in said trunk circuit, means for operating said slow-to-release relay responsive to said extension of said connection, a refund key at said paystation, means including the release means in said line circuit operated in case said key is operated responsive to a refund operation by said paystation and before said desired toll connection is answered, for initiating the release of said connection, a source of marking potential in the finder portion of said link, means for extending said marking to said trunk circuit, a control relay in said trunk circuit operated responsive to receipt of said marking, an indicating lamp at said operator's position, means including contacts operated by said control relay for causing said lamp to be illuminated in one manner responsive to said extended toll connection being answered at said position, for indicating to said answering operator that said call originated at the said paystation, a first set of contacts operated by said operated slow-to-release relay, a source of booster battery potential in said trunk circuit, means including other contacts operated by said control relay for applying said booster battery to said connection under control of said operated first set of said slow-to-release relay contacts, means responsive to said last-mentioned means for restoring said slow-to-release relay, means including a relay in said line circuit operated responsive to receipt of said booster battery for rendering the said means including the release means unresponsive to subsequent refund operations, said first set of slow-to-release relay contacts opened responsive to the restoration of said slow-to-release relay for removing the said application of said booster battery to said connection, a source of interrupted ground potential, a second set of contacts operated by said restored slow-to-release relay, and means controlled by said second set of slow-to-release relay contacts for extinguishing the first-mentioned illumination of said lamp and for applying said interrupted ground thereto to thereafter illuminate said lamp in a different manner, whereby said different manner of lamp illumination indictates to said answering operator that said booster battery was applied to said connection and has been removed.

7. In a telephone system, a calling subscriber station of one class, a calling subscriber station of another class, switching equipment common to both said classes of subscriber stations and having access thereto for extending desired connections normally comprising line conductors, a local subscriber station, connecting equipment accessible to said switching equipment and operated for extending connections from either class of subscriber station to said local subscriber station at certain times, a toll operator's position for answering and extending toll connections, a trunk circuit accessible to said switching equipment and terminating at said toll operator's position, means including said switching equipment operated to extend a connection from either class of subscriber station over said trunk circuit to said operator's position at other times, line equipment individual to said one class subscriber station, line conductor unbalancing means included at said one class subscriber station, release means included in said line equipment, a differential relay included in said line equipment and having its windings connected in series with the said line conductors of connections extended from said one class of subscriber, said differential relay operated responsive to an operation of said line unbalancing means by said one class of subscriber, at said certain time if the said connection extended from one class of subscriber to said local subscriber station has not been answered, and at said other time if the said connection extended from said one class of subscriber to said toll operator's position has not been answered, means operated by said operation of said differential relay for operating said release means, means operated by said release means for opening the said line conductors to release the said unanswered connection extended from said one class of subscriber, a first source of booster battery and included in said switching equipment, means for applying said first booster battery to an extended connection responsive to answering, if in a first case the connection is extended from said one class of subscriber to said local subscriber, and if in a second case the connection is extended from said other class of subscriber to said local subscriber, means including shunting means in said line equipment and operated responsive to receipt of said first booster battery when said first case connection is answered, for shunting said differential relay to render said relay unresponsive to subsequent line conductor unbalancings, metering means at said other class of subscriber station operated responsive to receipt of said first booster battery when said second case connection is answered for metering the second case connection, a second source of booster battery and included in said trunk circuit, means for applying said second source of booster battery to the extended said other time connections, and means for operating said last-mentioned means only in the event the said last-mentioned connection is between said one class of subscriber and said operator's position, whereby the said means including said shunting means is operated responsive to receipt of said second booster battery for shunting said differential relay to render said relay unresponsive to subsequent line conductor unbalancings.

References Cited in the file of this patent

UNITED STATES PATENTS

| | | |
|---|---|---|
| 2,655,558 | Kessler | Oct. 13, 1953 |
| 2,750,447 | Lomax | June 12, 1956 |